US012580511B2

(12) United States Patent
Kaidu et al.

(10) Patent No.: US 12,580,511 B2
(45) Date of Patent: Mar. 17, 2026

(54) MOTOR DRIVE CONTROL DEVICE, MOTOR DRIVE CONTROL SYSTEM, FAN SYSTEM, AND MOTOR DRIVE CONTROL METHOD

(71) Applicant: MINEBEA MITSUMI Inc., Kitasaku-gun (JP)

(72) Inventors: Hiroyuki Kaidu, Kitasaku-gun (JP); Masato Aoki, Kitasaku-gun (JP); Yoshihisa Okabuchi, Kitasaku-gun (JP); Takahiro Saito, Kitasaku-gun (JP); Takayuki Sugaya, Kitasaku-gun (JP)

(73) Assignee: MINEBA MITSUMI INC., Nagano (JP)

( * ) Notice: Subject to any disclaimer, the term of this patent is extended or adjusted under 35 U.S.C. 154(b) by 158 days.

(21) Appl. No.: 18/567,535

(22) PCT Filed: Mar. 17, 2022

(86) PCT No.: PCT/JP2022/012307
§ 371 (c)(1),
(2) Date: Dec. 6, 2023

(87) PCT Pub. No.: WO2022/259685
PCT Pub. Date: Dec. 15, 2022

(65) Prior Publication Data
US 2024/0266983 A1 Aug. 8, 2024

(30) Foreign Application Priority Data
Jun. 8, 2021 (JP) ................................. 2021-095652

(51) Int. Cl.
H02P 29/024 (2016.01)
F04D 25/06 (2006.01)
(Continued)

(52) U.S. Cl.
CPC ........ H02P 29/024 (2013.01); F04D 25/0666 (2013.01); H02P 23/14 (2013.01); H02P 29/00 (2013.01)

(58) Field of Classification Search
CPC ........ H02P 29/024; H02P 23/14; H02P 29/00; F04D 25/0666
(Continued)

(56) References Cited

U.S. PATENT DOCUMENTS 8,766,576 B2 * 7/2014 Christmann ........ H02P 29/0241
                                                    318/400.27
9,577,568 B2 * 2/2017 Loerincz ............... H02P 29/024
2022/0006418 A1 * 1/2022 Sato ........................ B64C 13/00

FOREIGN PATENT DOCUMENTS

JP          05-344788 A    12/1993
JP          07-194186 A     7/1995
(Continued)

OTHER PUBLICATIONS

International Search Report for corresponding International Application No. PCT/JP2022/012307 mailed May 24, 2022.
(Continued)

*Primary Examiner* — David Luo
(74) *Attorney, Agent, or Firm* — Chrisman Gallo Tochtrop LLC

(57) ABSTRACT

To appropriately detect an abnormal state of a motor without monitoring air pressure. A motor drive control device includes a monitoring control unit for setting a physical quantity related to operation of a drive-target motor as a monitoring parameter, and monitoring an operation state of the drive-target motor based on measurement data of the monitoring parameter and a reference value of the monitoring parameter. The monitoring control unit determines whether the drive-target motor is in an abnormal state based on a comparison result between a deviation of the measured
(Continued)

value from the reference value of the monitoring parameter in the drive-target motor and a deviation of the measured value from the reference value of the monitoring parameter in another motor acquired by a communication unit.

10 Claims, 8 Drawing Sheets

(51) Int. Cl.
   H02P 23/14 (2006.01)
   H02P 29/00 (2016.01)

(58) Field of Classification Search
   USPC ........................................ 318/490, 560, 625
   See application file for complete search history.

(56) References Cited

FOREIGN PATENT DOCUMENTS

| | | |
|---|---|---|
| JP | 2001-286187 A | 10/2001 |
| JP | 2020-099167 A | 6/2020 |
| WO | 2020/105337 A1 | 5/2020 |

OTHER PUBLICATIONS

Written Opinion for corresponding International Application No. PCT/JP2022/012307 dated May 24, 2022 and English translation.

* cited by examiner

| MONITORING MODE | MONITORING PARAMETER | CONDITION PARAMETER | CORRECTION PARAMETER (OPTIONAL) | |
|---|---|---|---|---|
| 1 | COIL CURRENT | ROTATIONAL SPEED | COIL VOLTAGE | TEMPERATURE |
| 2 | ROTATIONAL SPEED | COIL CURRENT | COIL VOLTAGE | TEMPERATURE |
| 3 | COIL VOLTAGE | ROTATIONAL SPEED | COIL CURRENT | TEMPERATURE |
| 4 | ROTATIONAL SPEED | COIL VOLTAGE | COIL CURRENT | TEMPERATURE |

MOTOR DRIVE CONTROL DEVICE, MOTOR DRIVE CONTROL SYSTEM, FAN SYSTEM, AND MOTOR DRIVE CONTROL METHOD

CROSS-REFERENCE TO RELATED APPLICATIONS

This application is a national stage entry of International Application No. PCT/JP2022/012307 filed on Mar. 17, 2022, which claims the benefit of priority to Japanese Application No. JP2021-095652, filed Jun. 8, 2021, the entire disclosures of which are hereby incorporated herein by reference.

TECHNICAL FIELD

The present invention relates to a motor drive control device, a motor drive control system, a fan system, and a motor drive control method.

BACKGROUND ART

A certain motor drive system controls a plurality of motor drive control devices by one control device and drives motors connected to the respective motor drive control devices. As a motor drive system described above, for example, a certain motor drive system is used in an electrical apparatus system and cools the electrical apparatus by driving a plurality of fans (fan motors) disposed at respective portions of the electrical apparatus by one control device (for example, Patent Document 1).

Patent Document 1 describes a configuration of an electrical apparatus system including a plurality of fan control means for controlling fans and a system control means for controlling the electrical apparatus system, the configuration allowing a plurality of fans to be controlled by performing data communication between the system control means and the plurality of fan control means.

CITATION LIST

Patent Literature

Patent Document 1: JP 2001-286187 A

SUMMARY OF INVENTION

Technical Problem

As a method for detecting an abnormality of a fan, for example, a method for detecting an abnormality of a bearing of a motor constituting the fan is known. In order to accurately detect the abnormality of the bearing, an algorithm for detecting the abnormality in consideration of correlations among the voltage, current, rotational speed of the motor, the temperature around the motor, air pressure, and the like is preferably constructed.

When a motor drive control device for driving a motor detects an abnormality of a bearing in accordance with the above-described algorithm for abnormality detection, a sensor for measuring a physical quantity exemplified by a voltage, a current, a temperature, a rotational speed, or an air pressure is required.

While measurement of a voltage, a current, a rotational speed, and a temperature can be realized by relatively inexpensive circuitry, measurement of an air pressure requires expensive sensors and circuitry. However, in the case of a motor, since air pressure is one of important parameters for accurately detecting an abnormality of a bearing, ignoring information about air pressure is not advisable. In particular, in a case of installing a plurality of fans (fan motors) at a closed space exemplified by the inside of a server to cool an electronic apparatus or the like, air pressure within the space is likely to fluctuate. Hence, information about the air pressure is important in order to accurately detect an abnormality of the motor.

The present invention is intended to solve the problems described above, and has an object of making it possible to appropriately detect an abnormal state of a motor without monitoring air pressure.

Solution to Problem

A motor drive control device according to a representative embodiment of the present invention includes a drive control signal generation unit, a motor drive circuit, a communication unit, a measurement data generation unit, and a monitoring control unit. The drive control signal generation unit is configured to generate a drive control signal for controlling driving of a drive-target motor. The motor drive circuit is configured to drive the motor based on the drive control signal. The communication unit is configured to communicate with the outside. The measurement data generation unit is configured to generate measurement data including a measured value of a physical quantity related to operation of the drive-target motor. The monitoring control unit is configured to set the physical quantity related to the operation of the drive-target motor as a monitoring parameter, and monitor an operation state of the drive-target motor based on measurement data of the monitoring parameter and a reference value of the monitoring parameter. The monitoring control unit determines whether the drive-target motor is in an abnormal state based on a comparison result between a deviation of the measured value from the reference value of the monitoring parameter in the drive-target motor and a deviation of the measured value from the reference value of the monitoring parameter in another motor acquired by the communication unit.

Advantageous Effects of Invention

With one aspect of the present invention, an abnormal state of a motor can be appropriately detected without monitoring air pressure.

DESCRIPTION OF EMBODIMENTS

1. Overview of Embodiments

Figure 1:
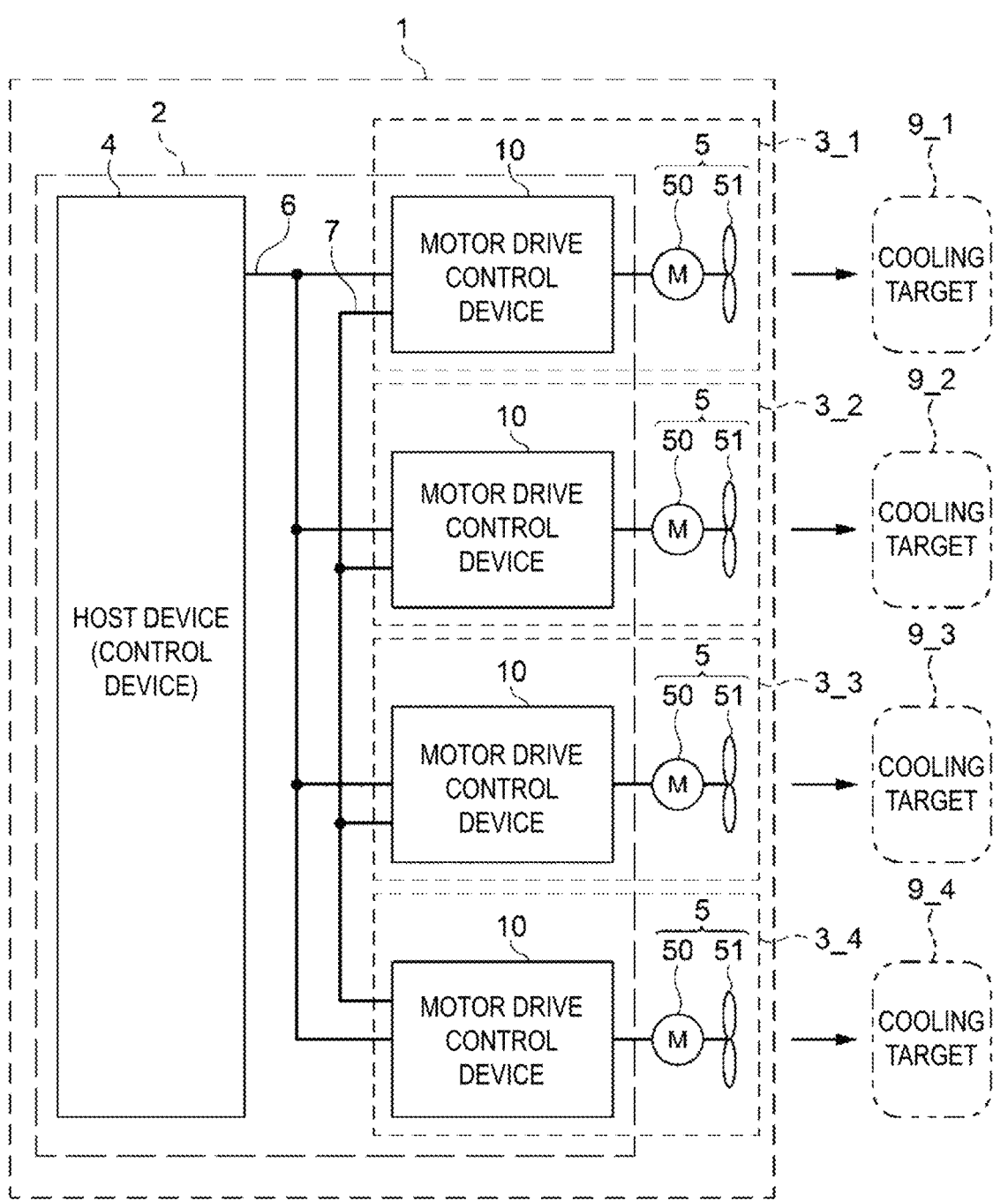
FIG. 1 is a diagram illustrating one example of a configuration of a fan system according to the present embodiment.

First, an overview of representative embodiments of the invention disclosed in the present application will be described. In the following description, reference signs on the drawings corresponding to the components of the invention are illustrated in parentheses as an example.

[1] A motor drive control device (10) according to a representative embodiment of the present invention includes a drive control signal generation unit (11), a motor drive circuit (19), a communication unit (15), a measurement data generation unit (23), and a monitoring control unit (24). The drive control signal generation unit (11) is configured to generate a drive control signal (Sd) for controlling driving of a drive-target motor (50). The motor drive circuit (19) is configured to drive the motor based on the drive control signal. The communication unit (15) is configured to communicate with the outside. The measurement data generation unit (23) is configured to generate measurement data (251) including a measured value of a physical quantity related to operation of the drive-target motor. The monitoring control unit (24) is configured to set the physical quantity related to the operation of the drive-target motor as a monitoring parameter, and monitor an operation state of the drive-target motor based on measurement data of the monitoring parameter and a reference value of the monitoring parameter. The monitoring control unit determines whether the drive-target motor is in an abnormal state based on a comparison result between a deviation of the measured value from the reference value of the monitoring parameter in the drive-target motor and a deviation of the measured value from the reference value of the monitoring parameter in another motor acquired by the communication unit.

[2] In the motor drive control device according to (1) above, the monitoring control unit may determine the drive-target motor to be in an abnormal state when a difference between the deviation of the measured value from the reference value of the monitoring parameter in the drive-target motor and the deviation of the measured value from the reference value of the monitoring parameter in the other motor exceeds a threshold value.

[3] In the motor drive control device according to (1) or (2) above, the monitoring control unit may acquire information about the deviation of the measured value from the reference value of the monitoring parameter in the other motor via the communication unit when the deviation of the measured value from the reference value of the monitoring parameter in the drive-target motor exceeds an allowable range based on the reference value.

[4] In the motor drive control device in any of (1) to (3) above, the physical quantity related to the operation of the drive-target motor may include a rotational speed, a coil current, and a coil voltage of the drive-target motor, and the monitoring control unit may select one among the rotational speed, the coil current, and the coil voltage as the monitoring parameter and set the reference value for each of the selected monitoring parameters.

[5] In the motor drive control device in (4) above, the monitoring control unit may select one physical quantity other than the monitoring parameter among the physical quantities related to the operation of the drive-target motor as a condition parameter, and set the reference value of the monitoring parameter based on the selected condition parameter.

[6] In the motor drive control device in (5) above, the physical quantity related to the operation of the drive-target motor may further include a temperature, and the monitoring control unit may set a physical quantity other than the monitoring parameter or the condition parameter as a correction parameter and correct the reference value of the monitoring parameter based on the correction parameter.

[7] A motor drive control system (2) according to a representative embodiment of the present invention may include a plurality of the motor drive control devices (10) according to any of [1] to [6] above, and the communication unit of the motor drive control device may communicate with the communication unit of another of the motor drive control devices.

[8] The motor drive control system in [7] above may further include a host device (4) configured to communicate with the motor drive control device, and the motor drive control device may notify the host device via the communication unit when an abnormal state of the motor is detected by the monitoring control unit.

[9] A fan system (1) according to a representative embodiment of the present invention includes the motor drive control system (2) above according to [7] or [8] above, a motor (50) disposed for each of the motor drive control devices and driven by the corresponding motor drive control device, and an impeller (51) disposed for each of the motors and configured to be rotatable by a rotational force of the corresponding motor.

[10] A motor drive control method according to a representative embodiment of the present invention includes generating a drive control signal (Sd) for controlling driving of a drive-target motor (50), driving the motor based on the drive control signal, communicating with the outside, generating measurement data including a measured value of a physical quantity related to operation of the drive-target motor, and setting the physical quantity related to the operation of the drive-target motor as a monitoring parameter, and monitoring an operation state of the drive-target motor based on measurement data of the monitoring param-
eter and a reference value of the monitoring parameter. The
setting includes determining whether the drive-target motor
is in an abnormal state based on a comparison result between
a deviation of the measured value from the reference value
of the monitoring parameter in the drive-target motor and a
deviation of the measured value from the reference value of
the monitoring parameter in another motor acquired in the
communicating.

2. Specific Examples of Embodiments

Specific examples of the embodiments of the present
invention will be described below with reference to the
drawings. In the following description, components com-
mon to the respective embodiments are denoted by the same
reference signs, and repeated descriptions are omitted.

Embodiments

FIG. 1 is a diagram illustrating one example of a con-
figuration of a fan system according to the present embodi-
ment.

A motor drive control system 2 illustrated in FIG. 1 is a
system including one host device (one example of the
outside) 4 as a control device and one or more motor drive
control devices 10. The host device 4 controls the respective
motor drive control devices 10 to drive motors 50 connected
to the respective motor drive control devices 10.

The motor drive control system 2 is used in, for example,
an electrical apparatus system, and constitutes a fan system
1 for controlling operations of a plurality of fans by one
control device and sending air to each of a plurality of
cooling targets. The fan system 1 according to the present
embodiment is disposed at a closed space inside a server, for
example, and constitutes a cooling system for cooling vari-
ous electronic components and the like constituting the
server.

The fan system 1 includes, for example, n (n is an integer
of 2 or more) fan devices 3_1 to 3_n provided for every n
cooling targets 9_1 to 9_n, and a host device (one example
of a control device) 4 for transmitting various commands for
driving the motors 50 of the respective fan devices 3_1 to
3_n to the respective fan devices 3_1 to 3_n.

In the following description, when each of the fan devices
3_1 to 3_n is not distinguished, each of the fans is also
referred to as a "fan device 3". In the present embodiment,
as one example, the fan system 1 is described as including
four fan devices 3_1 to 3_4 corresponding to four (n=4)
cooling targets, respectively. However, the number of the fan
devices 3 included in the fan system 1 need only be one or
more, and the number is not particularly limited.

The host device 4 is a control device for controlling
driving of each of the fan devices 3. For example, when the
fan system 1 constitutes a cooling system for a server, the
host device 4 is a program processing device for realizing a
main function as the server.

For example, the host device 4 is realized by a program
processing device (for example, a microcontroller) being
accommodated inside one housing together with the fan
devices 3. The program processing device includes a pro-
cessor exemplified by a CPU, various types of storage
devices exemplified by a RAM and a ROM, and peripheral
circuits exemplified by a counter (a timer), an A/D conver-
sion circuit, a D/A conversion circuit, a clock generation
circuit, and an input/output I/F circuit. The processor, the storage devices, and the peripheral circuits are mutually
connected via a bus or a dedicated line.

The host device 4 controls each of the fan devices 3 to
allow airflow from the fans (motors) to be appropriate
according to, for example, an environmental change of the
fan system 1 (for example, a change in processing load or a
change in temperature inside the server) or conditions of the
fan devices to be controlled (for example, a change in the
number of fan devices to be controlled or a failure of some
fan devices).

The host device 4 and each of the fan devices 3 can
mutually transmit and receive data via a communication line
6. Also, the respective fan devices 3 can mutually transmit
and receive data via a communication line 7.

The present embodiment exemplifies a case of separating
the communication line 6 for communication between the
host device 4 and each of the fan devices 3 and the
communication line 7 for communication between the
respective fan devices 3, but no such limitation is intended.
For example, the communication between the host device
and each of the fan devices and the communication between
the fan devices may be realized by one common communi-
cation line. Also, the communication between the host
device 4 and each of the fan devices 3 and the communi-
cation between the respective fan devices 3 are not limited
to wired communication, and may be wireless communica-
tion. Further, a communication medium, a communication
method, and the like are not particularly limited.

Each fan device 3 includes the motor 50, an impeller 51,
and the motor drive control device 10 for controlling driving
of the motor 50 according to a command from the host
device 4.

The motor 50 is, for example, a three-phase brushless
motor. The type of motor 50 is not particularly limited, and
the number of phases is not limited to three phases.

The impeller (vane wheel) 51 is a component for gener-
ating an airflow, and is configured to be rotatable by the
rotational force of the motor 50. For example, a rotation
shaft of the impeller 51 is coaxially coupled to an output
shaft of the motor 50. In the present embodiment, the
impeller 51 and the motor 50 constitute one fan (fan motor)
5, for example.

Figure 2:
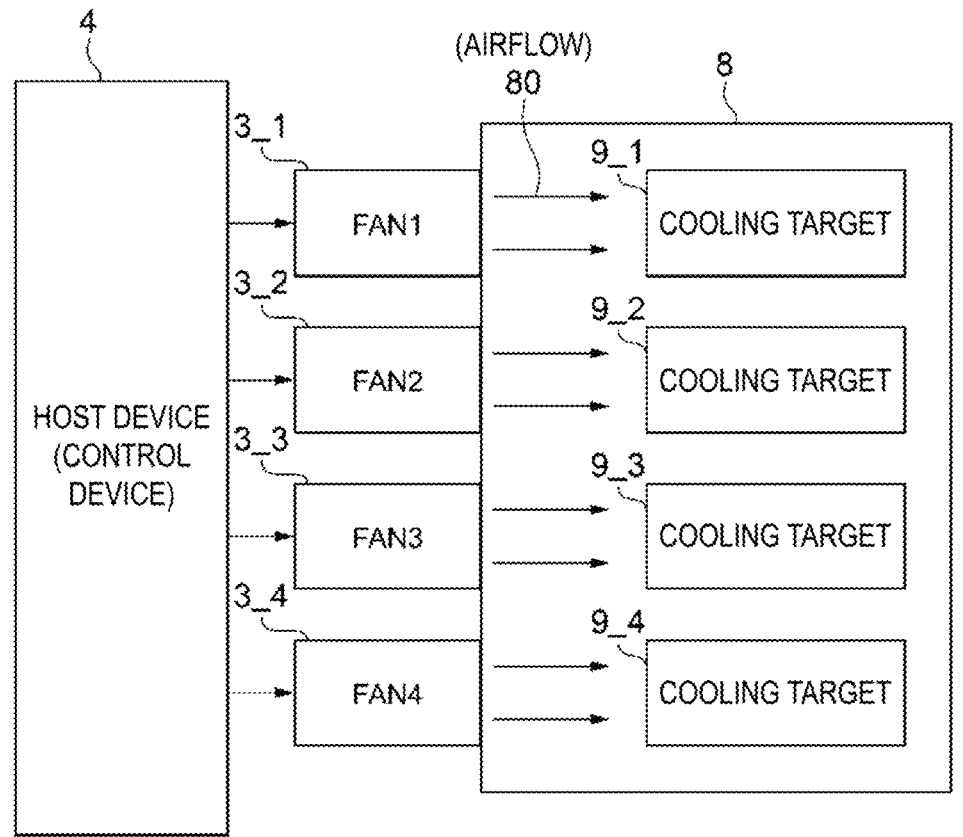
FIG. 2 is a diagram schematically illustrating an installation example of a fan device in the fan system according to the present embodiment.

FIG. 2 is a diagram schematically illustrating an instal-
lation example of the fan devices 3 in the fan system 1
according to the present embodiment.

In the fan system 1, for example, cooling targets 9_1 to
9_4 are disposed inside a housing 8 forming one partitioned
space, and the impellers 51 of the respective fan devices 3_1
to 3_4 are attached to four opening portions formed at the
housing 8. Accordingly, in a state of operation of the fan
devices 3_1 to 3_4, air pressure inside the housing 8
becomes substantially uniform. In other words, the motors
50 and the impellers 51 of the respective fan devices 3 are
installed within the same space having a uniform air pres-
sure. Here, the state of the air pressure being uniform is not
limited to a state of the air pressure received by each of the
motors 50 being the same, and includes a case of having
some error in the air pressure received by each of the motors
50. For example, when the error of the air pressure received
by each of the motors 50 does not exceed ±5%, the air
pressure can be said to be in a uniform state.

Figure 3:
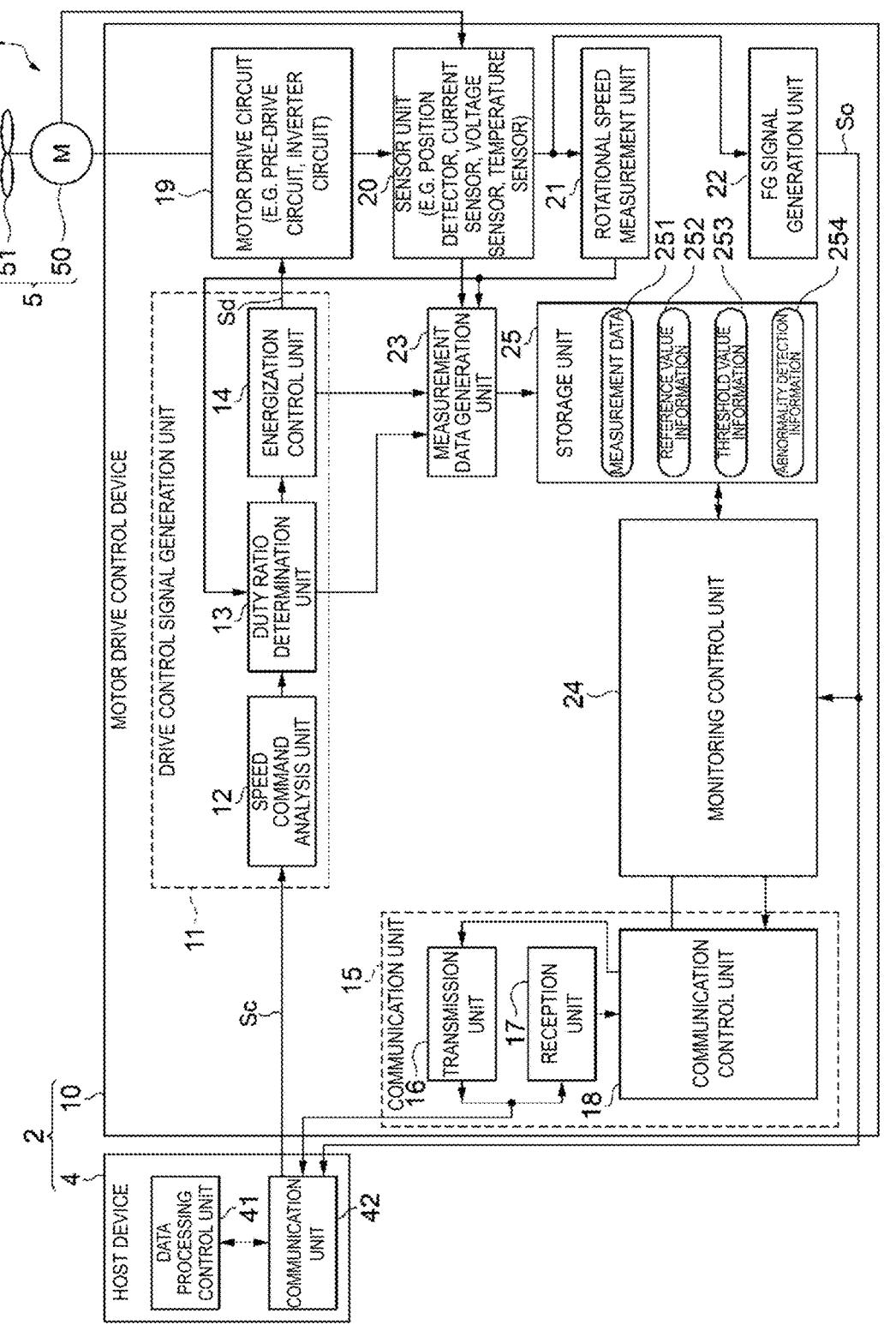
FIG. 3 is a diagram illustrating one example of a specific configuration of a motor drive control device in the fan system according to the present embodiment.

FIG. 3 is a diagram illustrating one example of a specific
configuration of the motor drive control device 10 in the fan
system 1 according to the present embodiment.

As illustrated in FIG. 3, the host device 4 includes, for
example, a data processing control unit 41 for realizing a main function as the server, and a communication unit 42 for communicating with each of the fan devices 3.

The communication between the host device 4 (communication unit 42) and each of the fan devices 3 (motor drive control devices 10) via the communication line 6 is realized by, for example, serial communication.

The data processing control unit 41 and the communication unit 42 are realized, for example, by a processor executing various types of arithmetic processes in accordance with a program stored in a memory and controlling peripheral circuits exemplified by a counter and an A/D conversion circuit in a program processing device constituting the host device 4.

In order to adjust the airflow supplied from each of the fan devices 3 disposed inside the server, for example, the data processing control unit 41 transmits, to each fan device 3, via the communication unit 42, a speed command signal Sc specifying a rotational speed (target rotational speed) to be a target for the motor 50 of each fan device 3.

The transmission and reception of the speed command signal Sc may be realized by using, for example, a dedicated line connecting the host device 4 and each of the fan devices 3 instead of the above-described serial communication. In this case, the speed command signal Sc may be, for example, a PWM signal having a duty ratio according to the target rotational speed.

The data processing control unit 41 monitors the rotation state of the motor 50 of each of the fan devices 3 by receiving, via the communication unit 42, a rotational speed signal So (for example, a frequency generator (FG) signal) output from each of the fan devices 3, the rotational speed signal So indicating the actual rotational speed (number of rotations) of the motor 50. The transmission and reception of the rotational speed signal So may be realized by using, for example, a dedicated line connecting the host device 4 and each of the fan devices 3, or may be realized by the above-described serial communication.

The data processing control unit 41 requests, via the communication unit 42, each of the fan devices 3 to transmit information regarding the operation of the motor 50, for example, the driving current and temperature of the motor 50, the cumulative operation time of the motor 50, and the presence or absence of abnormality occurrence, and receives, via the communication unit 42, information transmitted from each of the fan devices 3 in response to the request. Accordingly, the host device 4 can ascertain the driving states of the motors 50 in the respective fan devices 3 in more detail.

The motor drive control device 10 has, as main functions, a motor drive control function of controlling the rotation of the motor 50, a communication function of communicating with the host device 4 and with the other motor drive control devices 10 (fan devices 3), and a monitoring function of monitoring the operation state of the motor 50.

Specifically, as the motor drive control function, the motor drive control device 10 generates a drive control signal Sd in response to a command (speed command signal Sc) from the host device 4, and causes a sinusoidal driving current to periodically flow through coils of respective phases (for example, three phases) of the motor 50 to rotate the motor 50.

As the communication function, the motor drive control device 10 transmits and receives data to and from the host device 4 to receive various commands from the host device 4, and transmits responses to the received commands and the like to the host device 4. In addition, the motor drive control device 10 transmits and receives data to and from the motor drive control devices 10 of the other fan devices 3 to acquire information about the operation states of the other motors 50, and gives information about the operation state of its own motor 50 to the other motor drive control devices 10.

As the monitoring function, the motor drive control device 10 measures physical quantities related to the operation of the drive-target motor 50 to monitor the operation state of the motor 50, and determines the presence or absence of an abnormality in the drive-target motor 50 based on the measurement result.

Here, the physical quantities related to the operation state of the motor 50 include, for example, a driving current (coil current) of the motor 50, a rotational speed (number of rotations) of the motor 50, a driving voltage (coil voltage) of the motor 50, and a temperature around the motor 50.

As illustrated in FIG. 3, the motor drive control device 10 includes, for example, a drive control signal generation unit 11, a communication unit 15, a motor drive circuit 19, a sensor unit 20, a rotational speed measurement unit 21, an FG signal generation unit 22, a measurement data generation unit 23, a monitoring control unit 24, and a storage unit 25 as functional units for realizing the respective functions described above.

Among the functional units, the drive control signal generation unit 11, the communication unit 15, the rotational speed measurement unit 21, the measurement data generation unit 23, the monitoring control unit 24, and the storage unit 25 are realized by, for example, a program processing device. For example, the above-described functional blocks are realized as follows. A program processing device (for example, a microcontroller) includes a processor exemplified by a CPU, various types of storage devices exemplified by a RAM and a ROM, and peripheral circuits exemplified by a counter (a timer), an A/D conversion circuit, a D/A conversion circuit, a clock generation circuit, and an input/output I/F circuit. The processor, the storage devices, and the peripheral circuits are mutually connected via a bus or a dedicated line. The CPU performs various types of arithmetic processes according to a program stored in a memory, and based on results of the processes, controls the peripheral circuits exemplified by the A/D conversion circuit and the input/output I/F circuit.

In the motor drive control device 10, the motor drive circuit 19 and at least some of the other functional units may be packaged as one integrated circuit device (IC), or the motor drive circuit 19 and the other functional units may be separately packaged as individual integrated circuit devices.

Each of the functional units constituting the motor drive control device 10 will be described in detail below.

The drive control signal generation unit 11 is a functional unit for generating the drive control signal Sd for controlling driving of the motor 50. For example, when the speed command signal Sc output from the host device 4 is received, the drive control signal generation unit 11 generates the drive control signal Sd to allow the rotational speed of the motor 50 to match the target rotational speed specified by the speed command signal Sc.

The drive control signal Sd is, for example, a pulse width modulation (PWM) signal.

As illustrated in FIG. 3, the drive control signal generation unit 11 includes, for example, a speed command analysis unit 12, a duty ratio determination unit 13, and an energization control unit 14.

The speed command analysis unit 12 receives the speed command signal Sc output from the host device 4 and analyzes the target rotational speed specified by the speed command signal Sc. For example, when the speed command signal Sc is a PWM signal having a duty ratio corresponding to the target rotational speed, the speed command analysis unit 12 analyzes the duty ratio of the speed command signal Sc and outputs information about the rotational speed corresponding to the duty ratio as the target rotational speed.

The duty ratio determination unit 13 determines the duty ratio of the PWM signal as the drive control signal Sd based on the target rotational speed output from the speed command analysis unit 12 and the measured value of the rotational speed of the motor 50 measured by the rotational speed measurement unit 21 described below. Specifically, the duty ratio determination unit 13 calculates a control amount of the motor 50 to reduce the difference between the target rotational speed and the measured value of the rotational speed of the motor 50, and determines the duty ratio of the PWM signal according to the control amount.

The energization control unit 14 generates a PWM signal having the duty ratio determined by the duty ratio determination unit 13 and outputs the PWM signal as the drive control signal Sd.

The motor drive circuit 19 drives the motor 50 based on the drive control signal Sd generated by the drive control signal generation unit 11. The motor drive circuit 19 includes, for example, an inverter circuit and a pre-drive circuit (not illustrated).

The inverter circuit outputs a drive signal to the motor 50 based on an output signal output from the pre-drive circuit and energizes coils included in the motor 50. For example, the inverter circuit is configured by a pair of series circuits each including two switch elements provided at both ends of a DC power supply being disposed for each phase of coils. In each of the pairs including two switch elements, a terminal of each phase of the motor 50 is connected to a connection point between the switch elements.

The pre-drive circuit generates an output signal for driving the inverter circuit in response to the drive control signal Sd, and outputs the generated output signal to the inverter circuit. The pre-drive circuit generates a drive signal for driving each switch element of the inverter circuit in response to, for example, the drive control signal Sd, and outputs the generated drive signal. When the drive signal turns on/off each switch element included in the inverter circuit, electric power is supplied to each phase of the motor 50, and a rotor of the motor 50 rotates.

The sensor unit 20 is a functional unit for detecting physical quantities related to the operation state of the motor 50. The sensor unit 20 includes various types of sensors exemplified by a position detector (for example, a Hall element) for detecting a rotational position of the motor 50, a current sensor (for example, a shunt resistor) for detecting a current flowing through a coil of the motor 50, a voltage sensor (for example, a resistive voltage divider circuit) for detecting a voltage of a coil of the motor 50, and a temperature sensor (for example, a thermistor) for detecting a temperature around the motor 50. Each sensor constituting the sensor unit 20 outputs an electric signal corresponding to each detected physical quantity. In the present embodiment, a case of providing the various types of sensors constituting the sensor unit 20 inside the motor drive control device 10 is exemplified, but all or a part of the various types of sensors constituting the sensor unit 20 may be provided outside the motor drive control device 10.

The rotational speed measurement unit 21 is a functional unit for measuring the rotational speed of the motor 50. For example, the rotational speed measurement unit 21 measures the rotational speed of the motor 50 based on the detection signal (Hall signal) of the Hall element as the position detector in the sensor unit 20, and outputs the measurement result.

The FG signal generation unit 22 generates an FG signal as a rotational speed signal So indicating the rotational speed of the motor 50. For example, the FG signal generation unit 22 generates a signal (FG signal) having a period (frequency) proportional to the rotational speed of the motor 50 based on the detection signal (Hall signal) output from the Hall element as the position detector in the sensor unit 20. The FG signal output from the FG signal generation unit 22 is input into the host device 4 as the rotational speed signal So.

The FG signal generation unit 22 may be realized by, for example, an FG pattern formed on a substrate (printed circuit board) mounted with the motor 50.

The communication unit 15 is a functional unit for communicating with the outside. Specifically, the communication unit 15 transmits and receives data to and from the host device 4 as the control device, and transmits and receives data to and from the other motor drive control devices 10 (fan devices 30). The communication between the communication units 15 of the respective motor drive control devices 10 via the communication line 7 is realized by serial communication, for example.

The communication unit 15 includes, for example, a transmission unit 16, a reception unit 17, and a communication control unit 18.

The transmission unit 16 transmits signals to the outside (for example, external devices including the host device 4 and the other motor drive control devices 10). The reception unit 17 receives signals from the outside. The transmission unit 16 and the reception unit 17 are, for example, interface circuits for serial communication controlled by the communication control unit 18 to generate predetermined serial signals, transmit the serial signals to a communication path, and receive the serial signals from the communication path.

The communication control unit 18 transmits encoded data to the transmission unit 16, and decodes data from the reception unit 17 in order to realize transmission and reception of data with the host device 4 and with the other motor drive control devices 10. The communication control unit 18 is realized by, for example, program processing by the processor constituting the motor drive control device 10 described above.

The communication control unit 18 gives a request command from another motor drive control device 10 received by the reception unit 17 to the monitoring control unit 24, and transmits a response to the request command given from the monitoring control unit 24 from the transmission unit 16 to the other motor drive control device 10.

For example, when the reception unit 17 receives a transmission request of information regarding the operation state of the drive-target motor 50 transmitted from another motor drive control device 10, the communication control unit 18 gives the transmission request to the monitoring control unit 24. Subsequently, the communication control unit 18 transmits the information regarding the operation state of the motor 50 received from the monitoring control unit 24 as a response to the transmission request from the transmission unit 16 to the other motor drive control device 10.

In addition, for example, when the communication control unit 18 receives a transmission request of information regarding the operation state of the motor 50 output from the monitoring control unit 24, the communication control unit 18 transmits the transmission request from the transmission unit 16 to another motor drive control device 10. Subsequently, when the reception unit 17 receives the information regarding the operation state of the drive-target motor 50 transmitted from the other motor drive control device 10 as a response to the transmission request, the communication control unit 18 gives the received information to the monitoring control unit 24.

Details of the above-described information regarding the operation state of the motor 50 to be transmitted and received to and from another motor drive control device 10 will be described below.

The measurement data generation unit 23 is a functional unit for generating measurement data 251 related to the operation of the motor 50. Specifically, the measurement data generation unit 23 generates the measurement data 251 based on the detection result of a physical quantity related to the operation state of the motor 50 detected by the sensor unit 20. For example, the measurement data generation unit 23 calculates measured values (digital values) of the physical quantities related to the operation state of the motor 50 based on the electric signals output from the various types of sensors of the sensor unit 20, and stores the measured values in the storage unit 25 as the measurement data 251.

For example, the measurement data generation unit 23 stores, as the measurement data 251, in the storage unit 25, the detection result of the temperature detected by the temperature sensor of the sensor unit 20 for each unit time. Additionally, for example, the measurement data generation unit 23 stores, as the measurement data 251, in the storage unit 25, the number of rotations (rotational speed) per unit time of the motor 50 measured by the rotational speed measurement unit 21. Additionally, for example, the measurement data generation unit 23 stores, as the measurement data 251, in the storage unit 25, a detected value of the driving current of the motor 50 detected by the current sensor of the sensor unit 20 for each unit time. Additionally, for example, the measurement data generation unit 23 stores, as the measurement data 251, in the storage unit 25, the detected value of the driving voltage (coil voltage) of the motor 50 detected by the voltage sensor for each unit time.

Additionally, the measurement data generation unit 23 may store, as the measurement data 251, in the storage unit 25, information about the duty ratio determined by the duty ratio determination unit 13 and information about the rising timing of the PWM signal as the drive control signal Sd output from the energization control unit 14.

The acquisition of the measurement data 251 by the measurement data generation unit 23 may be performed in response to a request from the host device 4 and another motor drive control device 10.

The monitoring control unit 24 is a functional unit for determining the presence or absence of an abnormality in the operation state of the drive-target motor 50.

Before describing the details of the monitoring control unit 24, correlations between physical quantities (parameters) related to the operation of the motor 50 will be described.

FIGS. 4A to 4G are graphs illustrating examples of the correlations between parameters (physical quantities) related to the operation of the motor.

Figures 4A, 4B, 4C, 4D:
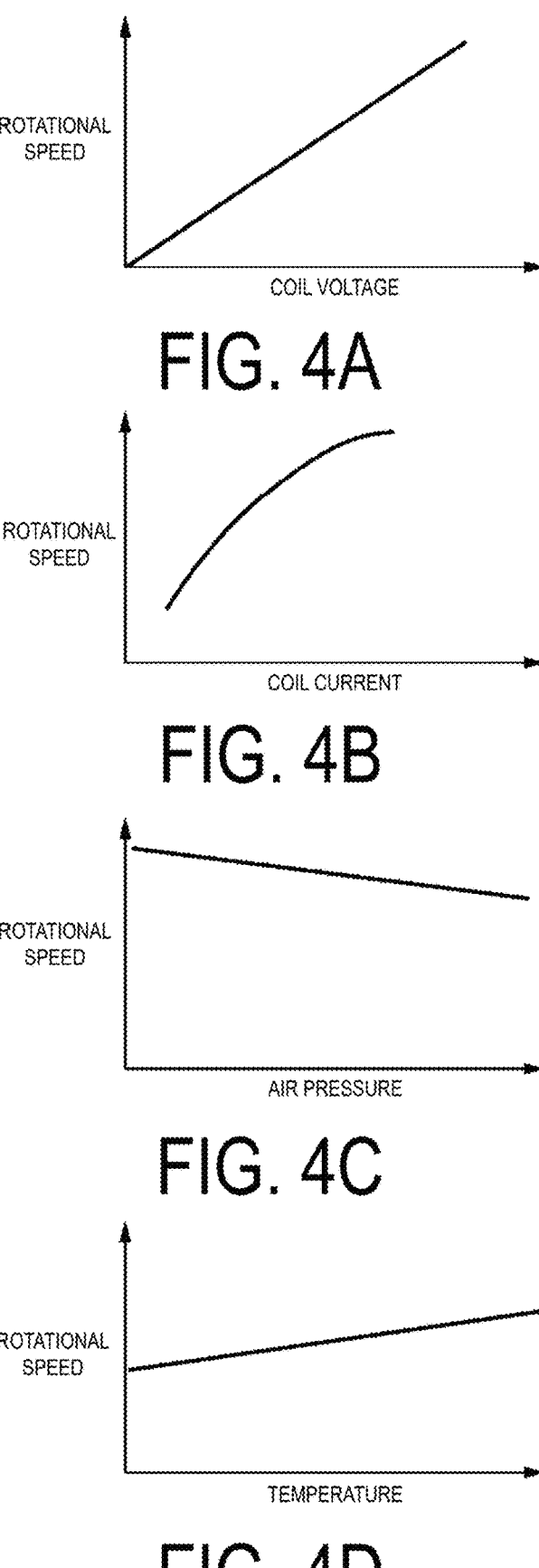
FIG. 4A is a graph indicating one example of a correlation between parameters (physical quantities) related to operation of a motor.
FIG. 4B is a graph indicating one example of a correlation between parameters (physical quantities) related to the operation of the motor.
FIG. 4C is a graph indicating one example of a correlation between parameters (physical quantities) related to the operation of the motor.
FIG. 4D is a graph indicating one example of a correlation between parameters (physical quantities) related to the operation of the motor.

In FIG. 4A, the horizontal axis represents the coil voltage of the motor 50, and the vertical axis represents the rotational speed of the motor 50. In FIG. 4B, the horizontal axis represents the coil current of the motor 50, and the vertical axis represents the rotational speed of the motor 50. In FIG. 4C, the horizontal axis represents air pressure, and the vertical axis represents the rotational speed of the motor 50.

Figure 4E:
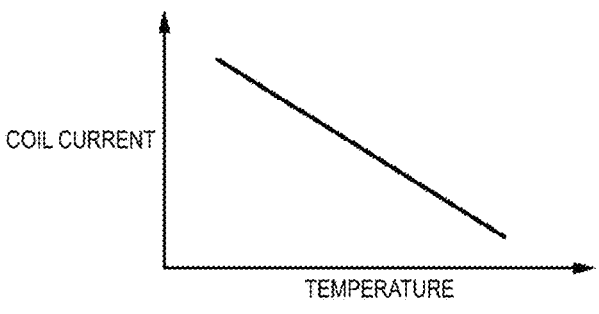
FIG. 4E is a graph indicating one example of a correlation between parameters (physical quantities) related to the operation of the motor.
Figure 4F:
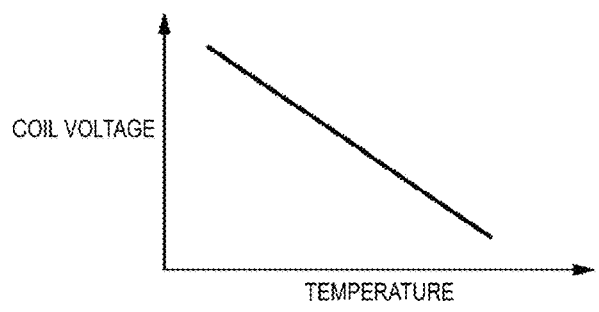
FIG. 4F is a graph indicating one example of a correlation between parameters (physical quantities) related to the operation of the motor.
Figure 4G:
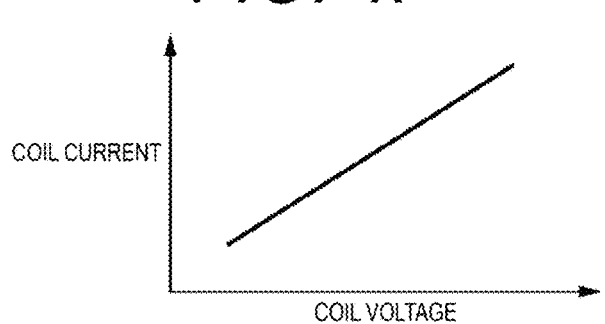
FIG. 4G is a graph indicating one example of a correlation between parameters (physical quantities) related to the operation of the motor.

In FIG. 4D, the horizontal axis represents temperature, and the vertical axis represents the rotational speed of the motor 50. In FIG. 4E, the horizontal axis represents temperature, and the vertical axis represents the coil current of the motor 50. In FIG. 4F, the horizontal axis represents temperature, and the vertical axis represents the coil voltage of the motor 50. In FIG. 4G, the horizontal axis represents coil voltage, and the vertical axis represents the coil current of the motor 50.

As understood from FIGS. 4A to 4G, the rotational speed, the coil current, the coil voltage, the temperature around the motor 50, and the air pressure related to the operation of the motor 50 have correlations with each other. In other words, since the appropriate value of a physical quantity related to the operation of the motor 50 changes depending on the operation state and the operation environment of the motor 50, a reference value (for example, threshold value) for determining whether the motor 50 is operating normally is not preferably set to a fixed value independent from the operation state and the operation environment of the motor 50.

Hence, the monitoring control unit 24 according to the present embodiment sets a monitoring parameter, a condition parameter, and a correction parameter from among the physical quantities related to the operation of the motor 50, and determines the presence or absence of an abnormality in the motor 50 by an abnormality determination algorithm using the three parameters.

The monitoring parameter is a parameter (physical quantity) to be monitored for determining the presence or absence of an abnormality in the motor 50. For example, any one among the rotational speed, the coil current, and the coil voltage of the drive-target motor 50 is set as the monitoring parameter.

The condition parameter is a parameter for determining a reference value for determining whether the measured value of the monitoring parameter is abnormal (hereinafter also referred to as a "reference value of the monitoring parameter" or simply a "reference value"). For example, among the rotational speed, the coil current, and the coil voltage of the drive-target motor 50, a physical quantity other than the physical quantity set as the monitoring parameter is set as the condition parameter.

The correction parameter is a parameter for correcting the reference value of the monitoring parameter set based on the condition parameter. For example, among the rotational speed, the coil current, the coil voltage of the drive-target motor 50, and the temperature around the motor 50, a physical quantity other than the physical quantities set as the monitoring parameter and the condition parameter is set as the correction parameter.

The monitoring control unit 24 selects one of the parameters (physical quantities) related to the operation of the motor 50 as a monitoring parameter, and monitors the measured value of the physical quantity selected as the monitoring parameter. The monitoring control unit 24 selects a physical quantity other than the monitoring parameter among the physical quantities related to the operation of the motor 50 as a condition parameter, and sets a reference value of the monitoring parameter based on the condition parameter. The monitoring control unit 24 performs abnormality determination processing for determining whether the drive-target motor 50 is in an abnormal state using the measured value of the monitoring parameter and the reference value of the monitoring parameter.

Here, a method for setting the reference value of the monitoring parameter will be described.

Figure 5A:
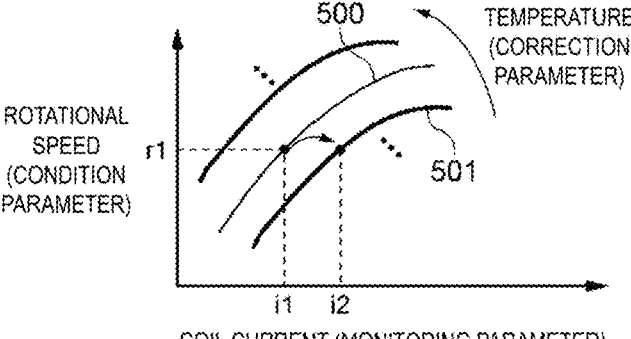
FIG. 5A is a graph for describing a method for setting a reference value of a monitoring parameter.
Figures 5B, 6:
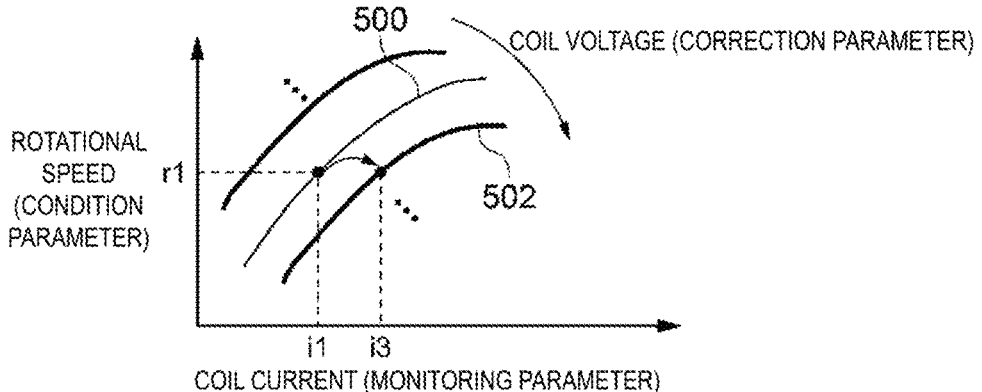
FIG. 5B is a graph for describing a method for setting a reference value of the monitoring parameter.
FIG. 6 is a chart indicating one example of a combination of the monitoring parameter, a condition parameter, and a correction parameter.

FIGS. 5A and 5B are graphs for describing a method for setting a reference value of the monitoring parameter. In FIGS. 5A and 5B, the horizontal axis represents the coil current of the motor 50, and the vertical axis represents the rotational speed of the motor 50. Reference numeral 500 represents a function indicating the correspondence between the coil current and the rotational speed.

For example, when the coil current is the monitoring parameter and the rotational speed is the condition parameter, the monitoring control unit 24 calculates the reference value of the coil current as the monitoring parameter based on the measured value of the rotational speed of the motor 50 at the time. For example, when the measured value of the rotational speed of the motor 50 as the condition parameter is "r1", as indicated in FIG. 5A, the monitoring control unit 24 sets the reference value of the coil current as the monitoring parameter as "i1" by using the function 500 indicating the correspondence between the coil current and the rotational speed indicated in FIG. 5A. Information about the reference value (reference value information) 252 is stored in the storage unit 25, for example, and is updated every time the monitoring control unit 24 performs calculation.

Information about the function (for example, the correlations illustrated in FIGS. 4A to 4G) indicating a correspondence between two parameters represented by the function 500 is stored, for example, in the storage unit 25.

As indicated in FIGS. 4A to 4G, since the coil current and the rotational speed are dependent on the temperature, the correspondence between the coil current and the rotational speed also changes according to the temperature. In other words, as indicated in FIG. 5A, a plurality of functions indicating the correspondence between the coil current and the rotational speed exist for each temperature. Similarly, as indicated in FIG. 5B, a plurality of functions indicating the correspondence between the coil current and the rotational speed exist for each coil voltage.

Hence, the monitoring control unit 24 may correct the reference value of the monitoring parameter determined based on the condition parameter by using the correction parameter. For example, a plurality of functions indicating the correspondence between the monitoring parameter and the condition parameter for each correction parameter may be prepared and stored in the storage unit 25 in advance, and the monitoring control unit 24 may select an appropriate function corresponding to the measured value of the correction parameter from the plurality of functions stored in the storage unit 25 and determine the reference value using the selected function.

For example, when the temperature is set as the correction parameter, as indicated in FIG. 5A, the monitoring control unit 24 selects a function 501 corresponding to a measured value Tl of the temperature, and uses the function 501 to set the value i2 of the coil current corresponding to the rotational speed r1 being the condition parameter as the reference value of the coil current. In addition, for example, when the coil voltage is set as the correction parameter, as indicated in FIG. 5B, the monitoring control unit 24 selects a function 502 corresponding to a measured value V1 of the coil voltage, and uses the function 502 to set the value i3 of the coil current corresponding to the rotational speed r1 being the condition parameter as the reference value of the coil current.

The method for correcting the reference value of the monitoring parameter is not limited to the above-described method. For example, the monitoring control unit 24 may correct the reference value calculated based on the condition parameter by performing addition, subtraction, multiplication, division, or the like of a coefficient corresponding to the measured value of the temperature or the coil voltage being the correction parameter to the reference value i1 determined based on the function 500 indicating the correspondence between the coil current as the monitoring parameter and the rotational speed as the condition parameter. In this case, the information about the coefficient may be stored in advance in the storage unit 25.

The monitoring control unit 24 selects one among the rotational speed, the coil current, and the coil voltage of the motor 50 as the physical quantities related to the operation of the drive-target motor 50 as a monitoring parameter, and sets a reference value for each selected monitoring parameter.

FIG. 6 is a chart indicating one example of a combination of the monitoring parameter, the condition parameter, and the correction parameter.

As indicated in FIG. 6, the motor drive control device 10 has a plurality of monitoring modes. The monitoring control unit 24 switches the monitoring target according to the monitoring mode set. For example, when Mode 1 is set as the monitoring mode, the monitoring control unit 24 monitors the coil current as the monitoring parameter, determines the reference value of the coil current based on the rotational speed as the condition parameter, and corrects the reference value of the coil current based on the coil voltage or the temperature as the correction parameter.

For example, the monitoring control unit 24 switches the monitoring mode in a predetermined order to determine whether the motor 50 is in an abnormal state for each of a plurality of parameters (physical quantities) related to the operation of the motor 50.

The above-described correction of the reference value of the monitoring parameter is not essential, and the reference value of the monitoring parameter may be determined by the condition parameter alone.

As described above, the rotational speed, the coil current, and the coil voltage of the motor 50 are affected not only by the temperature around the motor 50 but also by the air pressure. Hence, construction of an abnormality determination algorithm of the motor 50 in consideration of air pressure is desirable. However, providing means for measuring air pressure is not easy.

On the other hand, since the drive-target motor 50 and the other motors 50 are disposed within the same space having a uniform air pressure, the influence of the air pressure on each motor 50 is substantially equal. In other words, when the air pressure changes and the measured value of the monitoring parameter in the drive-target motor 50 changes, the measured values of the monitoring parameter in the other motors 50 are similarly affected by the air pressure and change. For example, as indicated in FIG. 4C, when the air pressure increases and the rotational speed of one motor 50 decreases, the rotational speeds of the other motors 50 placed under the same environment also decrease.

Hence, the motor drive control device 10 according to the present embodiment determines the presence or absence of an abnormality in the drive-target motor 50 by comparing the measurement result of a physical quantity related to the operation of the drive-target motor 50 of the motor drive control device 10 itself with the measurement result of the physical quantity related to the operation of another motor 50, instead of measuring the air pressure.

Specifically, as the abnormality determination processing of the motor 50, the monitoring control unit 24 determines whether the drive-target motor 50 is in an abnormal state based on comparison results between the deviation of the measured value from the reference value of the monitoring parameter in the drive-target motor 50 and the deviation of the measured value from the reference value of the monitoring parameter in the other motor 50 acquired by the communication unit 15.

More specifically, when the deviation of the measured value from the reference value of the monitoring parameter in the drive-target motor 50 exceeds an allowable range based on the reference value, the monitoring control unit 24 acquires information about the deviation of the measured value from the reference value of the monitoring parameter in the other motor 50 via the communication unit 15.

For example, the following case is considered. The coil current of the motor 50 is set as the monitoring parameter, the ratio of the deviation width of the measured value from the reference value of the coil current of the drive-target motor 50 with respect to the reference value (hereinafter also referred to as a "deviation ratio") is 25%, and the allowable range based on the reference value of the coil current is ±20%. In this case, since the deviation ratio (25%) of the coil current of the drive-target motor 50 exceeds the allowable range (±20%) based on the reference value of the coil current, the monitoring control unit 24 requests the other motor drive control device 10 to transmit information about the deviation of the measured value from the reference value of the monitoring parameter in the other motor 50 via the communication unit 15.

When the difference between the deviation of the measured value from the reference value of the monitoring parameter in the drive-target motor 50 and the deviation of the measured value from the reference value of the monitoring parameter in the other motor 50 acquired via the communication unit 15 exceeds the threshold value, the monitoring control unit 24 determines the drive-target motor 50 to be in an abnormal state. Information about the threshold value (threshold value information) 253 is, for example, stored in advance in the storage unit 25.

In the above-described example, the following case is further considered. The deviation ratio of the coil current of the other motor 50 is 24% and a threshold value (second threshold value) for the abnormality determination is 10%. In this case, the difference (absolute value) between the deviation ratio (20%) of the coil current of the drive-target motor 50 and the deviation ratio (24%) of the coil current of the other motor 50 is "4%", and the difference is smaller than the threshold value "10%". Hence, the monitoring control unit 24 determines the drive-target motor 50 to be in the normal state.

On the other hand, a case of the deviation ratio of the coil current of the other motor 50 being 5% is considered. In this case, the difference (absolute value) between the deviation ratio (20%) of the coil current of the drive-target motor 50 and the deviation ratio (5%) of the coil current of the other motor 50 is "15%", and the difference is larger than the threshold value of 10%. Hence, the monitoring control unit 24 determines the drive-target motor 50 to be in an abnormal state.

When the motor 50 is determined to be in an abnormal state, the monitoring control unit 24 generates abnormality detection information 254 and stores the abnormality detection information 254 in the storage unit 25. The abnormality detection information 254 includes information indicating the content of the abnormality having occurred in the motor 50. The information indicating the content of the abnormality is, for example, information about an abnormality of the coil current, an abnormality of the coil voltage, an abnormality of the rotational speed, an abnormality of the temperature, and the like.

When the motor 50 is determined to be in an abnormal state, the monitoring control unit 24 transmits abnormality detection information 254 to the host device 4 via the communication unit 15. Accordingly, the host device 4 can ascertain the occurrence of abnormality in the fan device 3.

The monitoring control unit 24 may generate cumulative information indicating the degree of use of the motor 50 and store the cumulative information in the storage unit 25. The cumulative information includes, for example, information about the cumulative number of rotations and the cumulative operation time of the motor 50, and the like. For example, the monitoring control unit 24 may calculate, for the motor 50, the number of rotations of a motor per unit time based on the rotational speed signal So (FG signal) generated by the FG signal generation unit 22, calculate the cumulative number of rotations of the motor 50 by integrating the number of rotations, and store the cumulative number of rotations in the storage unit 25. In addition, for example, the monitoring control unit 24 may measure and integrate the operation time for each rotational speed of the motor 50, calculate the cumulative operation time of the motor 50 based on the integrated operation time for each rotational speed, and store the cumulative operation time in the storage unit 25. The monitoring control unit 24 may read out the cumulative information from the storage unit 25 and transmit the cumulative information to the host device 4 via the communication unit 15 in response to a command from the host device 4.

Next, a flow of the abnormality determination processing of the motor by the monitoring control unit 24 will be described.

Figure 7:
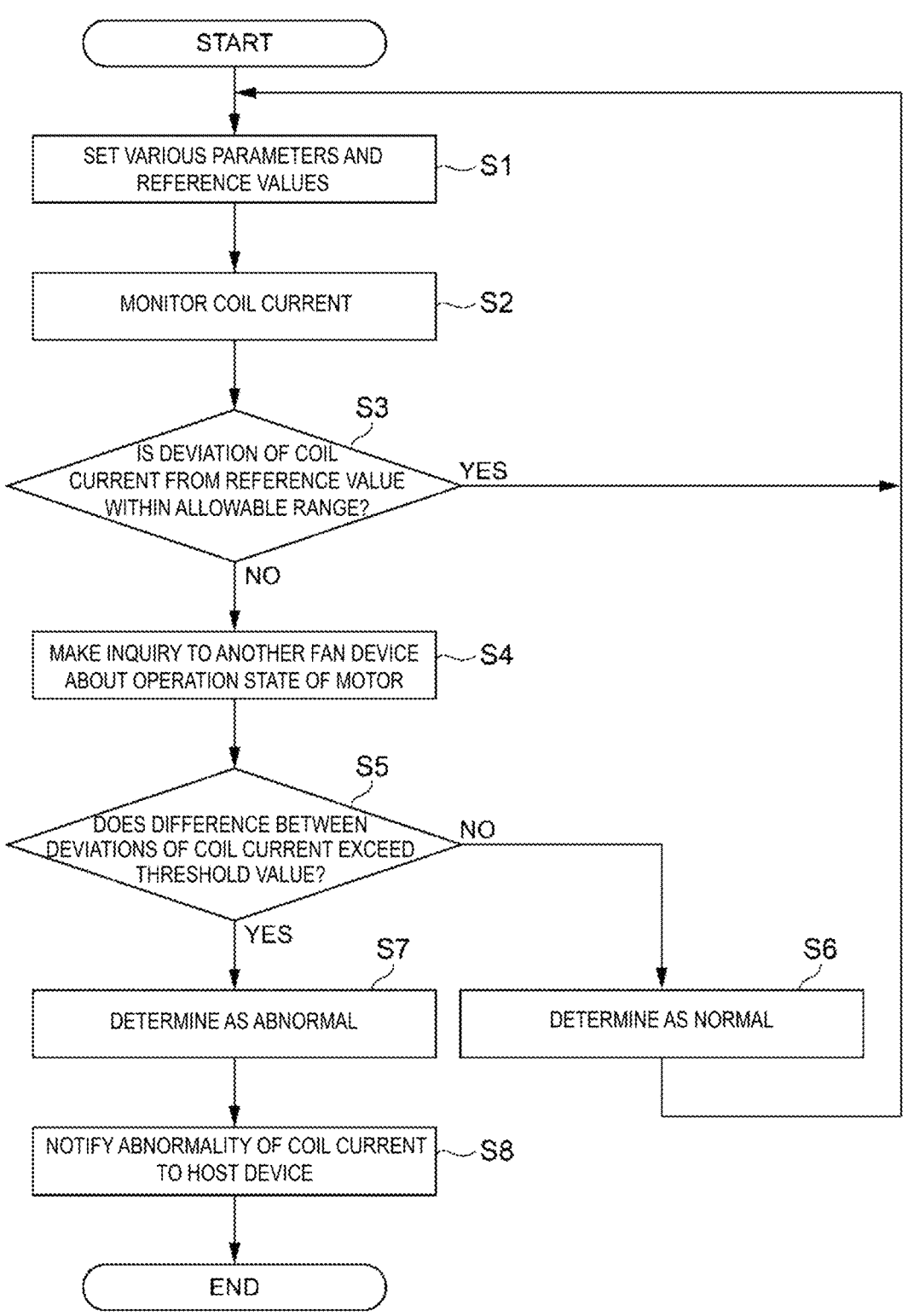
FIG. 7 is a flowchart illustrating one example of a flow of abnormality determination processing of the motor by a monitoring control unit.

FIG. 7 is a flowchart illustrating one example of a flow of the abnormality determination processing of the motor by the monitoring control unit 24.

For example, when a predetermined mode is set as the monitoring mode, the monitoring control unit 24 sets each of a monitoring parameter, a condition parameter, and a correction parameter according to the monitoring mode set, and sets a reference value of the monitoring parameter based on the condition parameter and correction parameter set (step S1).

Here, the following case will be described as an example. Mode 1 in FIG. 6 is selected as the monitoring mode, the coil current is set as the monitoring parameter, the rotational speed is set as the condition parameter, and the coil voltage and the temperature are set as the correction parameters.

The monitoring control unit 24 starts monitoring of the coil current set as the monitoring parameter (step S2). The monitoring control unit 24 determines whether the coil current is within an allowable range based on the reference value (step S3). For example, the monitoring control unit 24 calculates the deviation ratio of the coil current at the time, and determines whether the deviation ratio is within the allowable range (for example, ±20%) based on the reference value. When the deviation ratio of the coil current is within the allowable range (for example, ±20%) based on the reference value (step S3: YES), the monitoring control unit 24 returns to step S1.

On the other hand, when the deviation ratio of the coil current exceeds the allowable range (for example, ±20%) based on the reference value (step S3: NO), the monitoring control unit 24 makes an inquiry to another motor drive control device 10 (fan device 3) about the operation state of the other motor 50 (step S4).

Specifically, the monitoring control unit 24 transmits a transmission request of information regarding the operation state of the other motor 50 to the other motor drive control device 10 (fan device 3). In the case of the above-described example, the monitoring control unit 24 requests the other motor drive control device 10 (fan device 3) to transmit information indicating the deviation ratio of the coil current in the other motor 50 via the communication unit 15.

When the monitoring control unit 24 receives the information about the deviation ratio of the coil current in the other motor 50 as a response to the transmission request transmitted in step S4, the monitoring control unit 24 determines whether the difference between the deviation ratio of the coil current in the drive-target motor 50 and the deviation ratio of the coil current in the other motor 50 exceeds a threshold value (step S5).

When the difference does not exceed the threshold value (step S5: NO), the monitoring control unit 24 determines the drive-target motor 50 to not be in an abnormal state (normal state) (step S6). On the other hand, when the difference exceeds the threshold value (step S5: YES), the monitoring control unit 24 determines the drive-target motor 50 to be in an abnormal state, and generates the abnormality detection information 254 (step S7). The monitoring control unit 24 transmits the abnormality detection information 254 to the host device 4 via the communication unit 15 in order to notify the host device 4 of the occurrence of abnormality in the coil current of the drive-target motor 50 (step S8).

Next, communication between the plurality of motor drive control devices 10 in the fan system 1 will be described.

Figure 8:
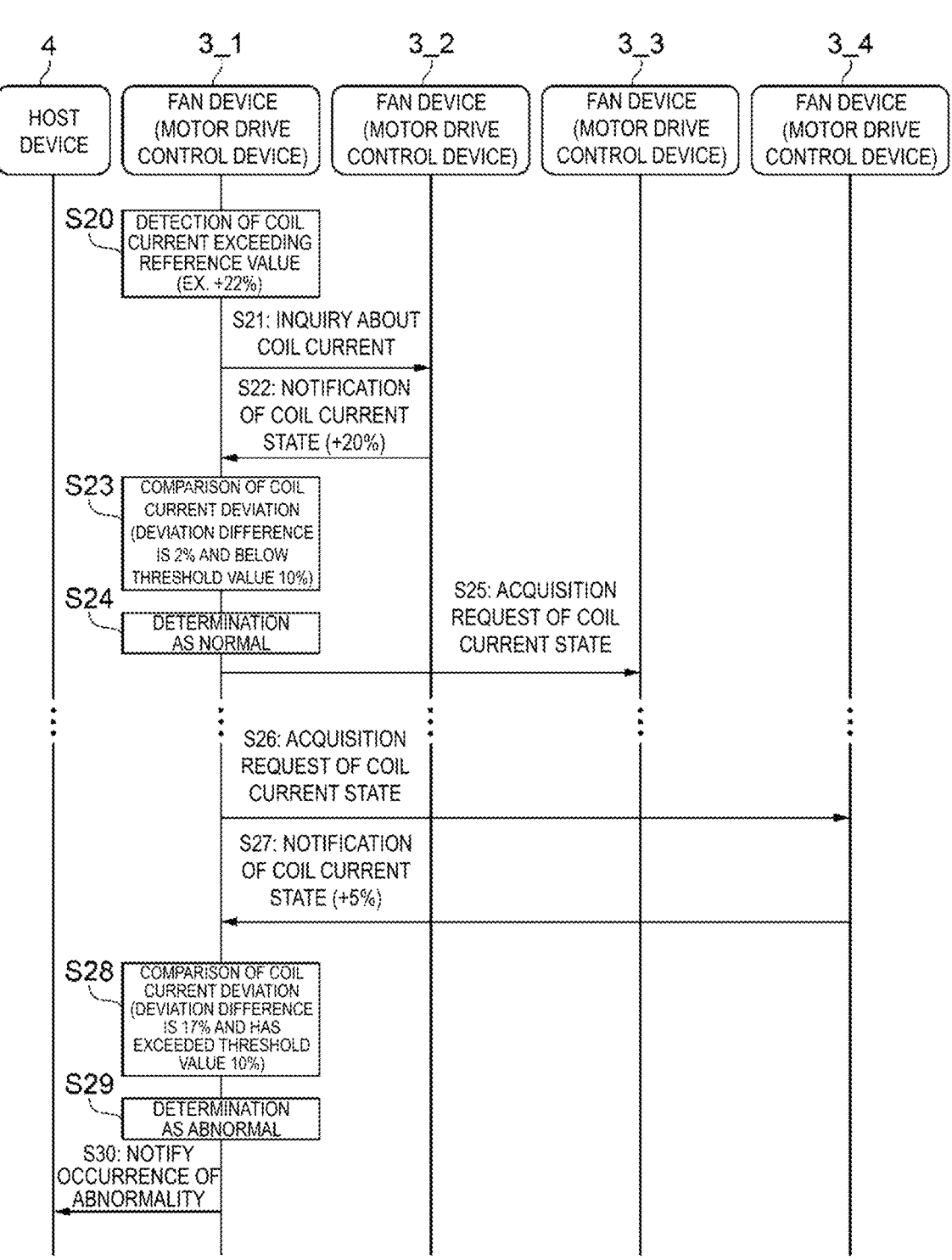
FIG. 8 is a sequence diagram illustrating one example of communication between a plurality of motor drive control devices in the fan system according to the present embodiment.

FIG. 8 is a sequence diagram illustrating one example of the communication between the plurality of motor drive control devices 10 in the fan system 1 according to the present embodiment.

For example, the following is assumed. In the motor drive control device 10 of the fan device 3_1, the deviation ratio of the coil current as the monitoring parameter exceeds an allowable range (±20%) during the rotation of the motor 50 (step S20). Here, the deviation ratio of the coil current of the motor 50 of the fan device 3_1 is assumed to be +22%.

First, the motor drive control device 10 of the fan device 3_1 makes an inquiry to the fan device 3_2 about the coil current as the monitoring parameter (step S21). Next, the motor drive control device 10 of the fan device 3_2 calculates the deviation ratio of the coil current of the drive-target motor 50 of the motor drive control device 10 itself, and transmits the information to the fan device 3_1 (step S22). Here, the deviation ratio of the coil current of the motor 50 in the fan device 3_2 is assumed to be +20%.

Next, the fan device 3_1 calculates the difference (22%−20%=2%) between the deviation ratio of the coil current of the drive-target motor 50 of the fan device 3_1 itself and the deviation ratio of the coil current of the motor 50 of the fan device 3_2, and compares the calculated difference with a threshold value (for example, 10%) (step S23). In the case of the above-described example, since the difference is "2%" and does not exceed the threshold value (10%), the motor drive control device 10 of the fan device 3_1 determines the drive-target motor 50 to be in a normal state (step S24).

Next, the motor drive control device 10 of the fan device 3_1 similarly makes an inquiry to the remaining fan devices 3_3 and 3_4 about the coil current (steps S25 and S26). Here, the deviation ratio of the coil current transmitted from the fan device 3_4 is assumed to be "+5%" (step S27).

The fan device 3_1 calculates the difference (22%−5%=17%) between the deviation ratio of the coil current of the drive-target motor 50 of the fan device 3_1 itself and the deviation ratio of the coil current of the motor 50 of the fan device 3_4, and compares the calculated difference with a threshold value (for example, 10%) (step S28). In the case of the above-described example, since the difference is "17%" and exceeds the threshold value (10%), the motor drive control device 10 of the fan device 3_1 determines the drive-target motor 50 to be in an abnormal state (step S29). The motor drive control device 10 of the fan device 3_1 notifies the host device 4 of the motor 50 being in an abnormal state (step S30).

Thus, in the motor drive control device 10 of each of the fan devices 3 in the fan system 1, when the deviation ratio of the measured value with respect to the reference value of the monitoring parameter exceeds a predetermined range, the motor drive control device 10 calculates each of the differences between the deviation ratio of its own monitoring parameter and the deviation ratios of the monitoring parameter of the other fan devices 3. For example, as in the present example, when at least one difference between the deviation ratios exceeds the threshold value, the drive-target motor 50 is determined to be in an abnormal state.

The motor drive control device 10 may calculate an average value of the deviation ratios of the monitoring parameter of the other fan devices 3, calculate the difference between the average value and the deviation ratio of its own monitoring parameter, and when the difference exceeds the threshold value, determine the drive-target motor 50 to be in an abnormal state.

As described above, the motor drive control device 10 according to the present embodiment uses a physical quantity related to the operation of the drive-target motor 50 as the monitoring parameter, and determines whether the drive-target motor 50 is in an abnormal state based on a comparison result between the deviation of the measured value from the reference value of the monitoring parameter in the drive-target motor 50 and the deviations of the measured values from the reference values of the monitoring parameter in the other motors 50 acquired by the communication unit 15.

As described above, in the case of installing the drive-target motor 50 and the motors 50 driven and controlled by the other motor drive control devices 10 within the same space having a uniform air pressure, when the measured value of the monitoring parameter of the drive-target motor 50 changes due to the influence of the air pressure, the measured values of the monitoring parameter of the other motors 50 also similarly change due to the influence of the air pressure.

Hence, as in the motor drive control device 10, by comparing the deviation of the measured value from the reference value of the monitoring parameter of the drive-target motor 50 with the deviations of the measured values from the reference values of the monitoring parameter of the other motors 50 acquired by the communication unit 15, relative influence of the air pressure between the monitoring parameters of the respective motors 50 can be ignored. Accordingly, an abnormal state of the motor 50 can be appropriately detected without monitoring the air pressure.

In addition, with the motor drive control device 10, since a sensor, a circuit, or the like for monitoring the air pressure is unnecessary, the motor drive control device having improved abnormality determination accuracy of the motor 50 while suppressing cost can be realized.

In addition, by comparing the deviations of the measured values from the reference values of the monitoring parameter in the respective motors 50 instead of comparing the actual measured values of the monitoring parameter in the respective motors 50, an abnormal state of the motor 50 can be appropriately detected even when the operation conditions of the respective motors 50 are different from each other, for example, when the rotational speeds of the respective motors 50 are different from each other.

The motor drive control device 10 according to the present embodiment determines the drive-target motor 50 to be in an abnormal state when the difference between the deviation of the measured value from the reference value of the monitoring parameter in the drive-target motor 50 and the deviation of the measured value from the reference value of the monitoring parameter in another motor 50 exceeds a threshold value.

Accordingly, the degree of deviation of the monitoring parameter of the drive-target motor 50 from the monitoring parameter of the other motor 50 can be quantitatively determined, and the abnormality determination processing of the motor 50 becomes facilitated.

When the deviation of the measured value from the reference value of the monitoring parameter in the drive-target motor 50 exceeds an allowable range based on the reference value, the monitoring control unit 24 acquires information about the deviations of the measured values from the reference values of the monitoring parameter in the other motors 50 via the communication unit 15.

Accordingly, since communication with the other motor drive control devices 10 is possible when the drive-target motor 50 is highly likely to be abnormal, the efficiency of communication between the motor drive control devices 10 can be improved.

In addition, the motor drive control device 10 according to the present embodiment selects one among the rotational speed of the motor 50 and the coil current and coil voltage of the motor 50 as the physical quantities related to the operation of the drive-target motor 50 as the monitoring parameter, and sets a reference value for each selected monitoring parameter.

Accordingly, the rotational speed of the motor 50 and the coil current and coil voltage of the motor 50 can each be set as a monitoring target for abnormality detection of the motor 50, and the abnormality determination processing of the motor 50 can be performed for each monitoring target.

The motor drive control device 10 according to the present embodiment selects one physical quantity other than the monitoring parameter among the physical quantities related to the operation of the drive-target motor 50 as the condition parameter, and sets the reference value of the monitoring parameter based on the selected condition parameter.

Accordingly, since an appropriate reference value can be set according to the operation state of the drive-target motor 50, the abnormality determination processing of the motor 50 in consideration of the correlations between the plurality of physical quantities related to the operation of the motor 50 can be performed.

Furthermore, the motor drive control device 10 according to the present embodiment may set a physical quantity including temperature other than the monitoring parameter or the condition parameter as a correction parameter, and correct the reference value of the monitoring parameter based on the correction parameter.

Accordingly, a more appropriate reference value can be set according to the operation state of the drive-target motor

50, and thus the abnormality determination processing of the motor 50 can be performed with higher accuracy.

Expansion of Embodiment

The invention conceived by the present inventors has been specifically described above based on the embodiments. However, the present invention is not limited to the embodiments, and of course, various modifications can be made without departing from the gist of the present invention.

For example, while the case of selecting one of the parameters (physical quantities) related to the operation of the motor as the monitoring parameter has been exemplified in the above-described embodiment, no such limitation is intended. For example, the monitoring control unit 24 may set and monitor a plurality of physical quantities as monitoring parameters. The number of phases of the motor driven by the motor drive control device according to the embodiment described above is not limited to three phases. Furthermore, the number of Hall elements is not limited to three.

Also, the method for detecting the rotational speed of the motor is not particularly limited. For example, the rotational speed may be detected by a position sensorless method for detecting a rotational speed using a back electromotive voltage induced in a motor coil instead of using a position detector exemplified by a Hall element.

The sequence diagrams and the flowcharts described above are specific examples, and the sequence diagrams and the flowcharts do not serve as any limitations. For example, other processes may be inserted between the respective steps, or the processes may be performed in parallel.

REFERENCE SIGNS LIST

1 Fan system, 2 Motor drive control system, 3, 3_1 to 3_4 Fan device, 4 Host device (one example of the outside), 5 Fan (fan motor), 6, 7 Communication line, 8 Housing, 9_1 to 9_4 Cooling target, 10 Motor drive control device, 11 Drive control signal generation unit, 12 Speed command analysis unit, 13 Duty ratio determination unit, 14 Energization control unit, 15 Communication unit, 16 Transmission unit, 17 Reception unit, 18 Communication control unit, 19 Motor drive circuit, 20 Sensor unit, 21 Rotational speed measurement unit, 22 FG signal generation unit, 23 Measurement data generation unit, 24 Monitoring control unit, 25 Storage unit, 41 Data processing control unit, 42 Communication unit, 50 Motor, 51 Impeller (vane wheel), 251 Measurement data, 252 Reference value information, 253 Threshold value information, 254 Abnormality detection information, Sc Speed command signal, Sd Drive control signal, So Rotational speed signal.

The invention claimed is:

1. A motor drive control device, comprising:

a motor drive circuit configured to drive a target motor based on a drive control signal and a drive control circuit configured to generate the drive control signal for controlling driving of the drive-target motor and to communicate with an environment outside of the drive-target motor, the drive control circuit comprising a processor; and the processor configured to generate measurement data including a measured value of a physical quantity related to operation of the drive-target motor; and the processor configured to set the physical quantity related to the operation of the drive-target motor as a monitoring parameter, and monitor an operation state of the drive-target motor based on measurement data of the monitoring parameter and a reference value of the monitoring parameter, wherein the processor is configured to determine whether the drive-target motor is in an abnormal state based on a comparison result between a deviation of the measured value from the reference value of the monitoring parameter in the drive-target motor and a deviation of the measured value from the reference value of the monitoring parameter in another motor acquired by communicating with the outside environment, and the processor is configured to acquire information about the deviation of the measured value from the reference value of the monitoring parameter in another motor from a host device or a drive control device of the another motor.

2. The motor drive control device according to claim 1, wherein the processor is configured to determine the drive-target motor to be in an abnormal state when a difference between the deviation of the measured value from the reference value of the monitoring parameter in the drive-target motor and the deviation of the measured value from the reference value of the monitoring parameter in the another motor exceeds a threshold value.

3. The motor drive control device according to claim 1, wherein the processor is configured to acquire information about the deviation of the measured value from the reference value of the monitoring parameter in the another motor via the communicating with the outside environment when the deviation of the measured value from the reference value of the monitoring parameter in the drive-target motor exceeds an allowable range based on the reference value.

4. The motor drive control device according to claim 1, wherein the physical quantity related to the operation of the drive-target motor includes a rotational speed, a coil current, and a coil voltage of the drive-target motor; and the processor is configured to select one among the rotational speed, the coil current, and the coil voltage as the monitoring parameter and sets the reference value for each of the selected monitoring parameters.

5. The motor drive control device according to claim 4, wherein the processor is configured to select one physical quantity other than the monitoring parameter among the physical quantities related to the operation of the drive-target motor as a condition parameter, and sets the reference value of the monitoring parameter based on the selected condition parameter.

6. The motor drive control device according to claim 5, wherein the physical quantity related to the operation of the drive-target motor further includes a temperature; and the processor is configured to set a physical quantity other than the monitoring parameter or the condition parameter as a correction parameter and corrects the reference value of the monitoring parameter based on the correction parameter.

7. A motor drive control system, comprising:

a plurality of the motor drive control devices according to claim 1, wherein the processor of a selected one motor drive control device communicates with the processor of a selected another of the motor drive control devices.

8. The motor drive control system according to claim 7, further comprising:

a host device configured to communicate with the selected one motor drive control device, wherein the selected one motor drive control device notifies the host device via the processor when an abnormal state of the corresponding motor is detected by the processor.

9. A fan system, comprising:

the motor drive control system according to claim 7;

a motor disposed for each of the motor drive control devices and driven by the corresponding motor drive control device; and an impeller disposed for each of the motors and configured to be rotatable by a rotational force of the corresponding motor.

10. A motor drive control method comprising:

generating a drive control signal for controlling driving of a drive-target motor;

driving the motor based on the drive control signal;

communicating with an environment outside of the drive-target motor;

generating measurement data including a measured value of a physical quantity related to operation of the drive-target motor; and setting the physical quantity related to the operation of the drive-target motor as a monitoring parameter, and monitoring an operation state of the drive-target motor based on measurement data of the monitoring parameter and a reference value of the monitoring parameter, wherein the setting includes determining whether the drive-target motor is in an abnormal state based on a comparison result between a deviation of the measured value from the reference value of the monitoring parameter in the drive-target motor and a deviation of the measured value from the reference value of the monitoring parameter in another motor acquired in the communicating with the outside environment, and wherein the communicating includes acquiring information about the deviation of the measured value from the reference value of the monitoring parameter in the another motor from a host device or a drive control device of the another motor.

* * * * *